(12) United States Patent
Golman et al.

(10) Patent No.: US 11,702,029 B1
(45) Date of Patent: Jul. 18, 2023

(54) DEPLOYABLE RESTRAINTS WITH TENSIONING MECHANISMS

(71) Applicants: Adam J. Golman, San Jose, CA (US); Jesse T. Buehler, Portola Valley, CA (US); Nathaniel J. Dennis, Saratoga, CA (US)

(72) Inventors: Adam J. Golman, San Jose, CA (US); Jesse T. Buehler, Portola Valley, CA (US); Nathaniel J. Dennis, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/552,891

(22) Filed: Dec. 16, 2021

Related U.S. Application Data (60) Provisional application No. 63/174,265, filed on Apr. 13, 2021, provisional application No. 63/166,308, filed on Mar. 26, 2021.

(51) Int. Cl.
*B60R 21/2338* (2011.01)
*B60R 21/233* (2006.01)
*B60R 21/232* (2011.01)

(52) U.S. Cl.
CPC ........ *B60R 21/2338* (2013.01); *B60R 21/232* (2013.01); *B60R 21/233* (2013.01); *B60R 2021/23388* (2013.01)

(58) Field of Classification Search
CPC ....... B60R 21/06; B60R 21/08; B60R 21/213; B60R 21/214; B60R 21/232; B60R 21/233; B60R 21/2338; B60R 2021/161; B60R 2021/23161; B60R 2021/23192; B60R 2021/23386; B60R 2021/23388
See application file for complete search history.

(56) References Cited

U.S. PATENT DOCUMENTS

| | | | | |
|---|---|---|---|---|
| 3,687,485 A * | 8/1972 | Campbell | ............. | B60R 21/213 280/733 |
| 3,774,936 A * | 11/1973 | Barnett | ................. | B60R 21/214 280/730.1 |
| 5,752,713 A * | 5/1998 | Matsuura | .......... | B60R 21/23138 280/730.2 |
| 6,095,551 A * | 8/2000 | O'Docherty | ............. | B60R 21/08 280/730.2 |
| 6,155,597 A * | 12/2000 | Bowers | ............... | B60R 21/2338 280/730.2 |
| 6,168,193 B1 * | 1/2001 | Shirk | .................... | B60R 21/232 280/736 |
| 6,168,194 B1 * | 1/2001 | Cuevas | ............... | B60R 21/2644 280/736 |

(Continued)

*Primary Examiner* — Laura Freedman
(74) *Attorney, Agent, or Firm* — Young Basile Hanlon & MacFarlane, P.C.

(57) ABSTRACT

A safety system includes an airbag configured to deploy from a rail and restrain motion of an occupant, a tether configured to deploy from a pillar, and an anchor coupling the tether and the airbag. The anchor is configured to travel from a stowed position proximate to the rail to a deployed position spaced apart from the rail and spaced apart from the pillar in unison with deployment of the airbag. The safety system includes a tensioning mechanism configured to apply force to the tether. Motion of the anchor is controlled by the force applied by the tensioning mechanism.

21 Claims, 8 Drawing Sheets

(56) References Cited

U.S. PATENT DOCUMENTS

| | | | |
|---|---|---|---|
| 6,203,058 B1* | 3/2001 | Elqadah | B60R 21/2338 280/751 |
| 6,308,982 B1* | 10/2001 | Wallner | B60R 21/2338 280/730.2 |
| 6,431,588 B1 | 8/2002 | Bayley et al. | |
| 6,695,341 B2* | 2/2004 | Winarto | B60R 21/232 280/730.2 |
| 6,709,010 B2* | 3/2004 | Dominissini | B60R 22/1953 280/730.2 |
| 7,004,498 B2 | 2/2006 | Daines et al. | |
| 7,195,276 B2* | 3/2007 | Higuchi | B60R 21/231 280/743.1 |
| 7,222,877 B2* | 5/2007 | Wipasuramonton | B60R 21/2338 280/730.2 |
| 7,350,804 B2* | 4/2008 | Bakhsh | B60R 21/232 280/730.2 |
| 7,938,439 B2* | 5/2011 | Hjerpe | B60R 21/237 280/730.2 |
| 8,562,018 B1* | 10/2013 | Wantin | B60R 21/232 280/730.2 |
| 9,327,669 B2* | 5/2016 | Jaradi | B60R 21/08 |
| 9,994,182 B1 | 6/2018 | Jaradi et al. | |
| 10,471,923 B2* | 11/2019 | Jimenez | B60R 21/23138 |
| 11,214,227 B2* | 1/2022 | Jayakar | B60R 21/232 |
| 11,458,922 B2* | 10/2022 | Fischer | B60R 21/231 |
| 2002/0070537 A1* | 6/2002 | Webber | B60R 21/232 280/730.2 |
| 2003/0080541 A1 | 5/2003 | Kalandek et al. | |
| 2003/0168835 A1 | 9/2003 | Thomas et al. | |
| 2004/0012174 A1 | 1/2004 | Tanaka et al. | |
| 2005/0116450 A1* | 6/2005 | Noguchi | B60R 21/2338 280/730.2 |

\* cited by examiner

DEPLOYABLE RESTRAINTS WITH TENSIONING MECHANISMS

CROSS-REFERENCE TO RELATED APPLICATIONS

This application claims the benefit of U.S. Provisional Patent Application No. 63/174,265, filed on Apr. 13, 2021, and U.S. Provisional Patent Application No. 63/166,308, filed on Mar. 26, 2021, the contents of which are hereby incorporated by reference in their entirety for all purposes.

TECHNICAL FIELD

This disclosure relates generally to safety systems and specifically to airbags, supports, and anchors within occupant safety systems.

BACKGROUND

In conventional vehicle cabins, surfaces such as a dash panel, a windshield, a door, a pillar, a roof rail, or combinations thereof can serve as anchor points and reaction surfaces for an airbag that deploys from a steering wheel, a roof rail, or the dash panel during a vehicle event such as a collision to prohibit an occupant from impacting these (or other) vehicle structures.

In vehicle cabins with open space and modular seating systems that can be arranged into a configuration consistent with the vehicle cabin serving as a mobile office, a living room, or otherwise open are, options for conventional anchor points are limited. In the absence of adequate anchors, airbags may be unable to be positioned to effectively protect an occupant during a vehicle event such as a collision. New approaches to safety systems are thus desired.

SUMMARY

One aspect of the disclosure is a safety system for a vehicle. The safety system includes an airbag configured to deploy from an interior surface of a vehicle and restrain motion of an occupant relative to the vehicle. The safety system includes a tether coupled to the airbag via an anchor. The tether is configured to guide the anchor from a stowed position proximate to the interior surface to a deployed position spaced from the interior surface of the vehicle and maintain the anchor in the deployed position while the airbag restrains motion of the occupant relative to the vehicle. The safety system includes a tensioning mechanism configured to reduce a length of the tether during deployment of the airbag.

Another aspect of the disclosure is safety system for a vehicle. The safety system includes a roof airbag configured to deploy from a roof rail of a vehicle and restrain motion of an occupant relative to the vehicle, a tether configured to deploy from a pillar of the vehicle, and an anchor coupling the tether and the roof airbag. The anchor is configured to travel from a stowed position proximate to the roof rail to a deployed position spaced apart from the roof rail and spaced apart from the pillar in unison with deployment of the airbag. The safety system includes a tensioning mechanism configured to apply force to the tether. Motion of the anchor is controlled by the force applied by the tensioning mechanism.

Another aspect of the disclosure is a safety system for a vehicle. The safety system includes a curtain configured to extend between pillars of a vehicle and an airbag configured to deploy from an interior surface of the vehicle and restrain motion of an occupant relative to the vehicle. The outer surface of the airbag is coupled to the curtain. The safety system includes a tether configured to cause the curtain to travel from a stowed position proximate to the interior surface of the vehicle to a deployed position extending between the pillars in unison with deployment of the airbag. The safety system includes a tensioning mechanism configured to apply force to the tether. Motion of the curtain and a position of the airbag in deployment is controlled by the force applied by the tensioning mechanism.

DETAILED DESCRIPTION

Safety systems are described for use in vehicle cabins lacking access to traditional anchor locations, for example, due to modifiable seating configurations or an open vehicle cabin design. The safety systems include an airbag, for example, a roof airbag, anchors coupled to the airbag, and tethers coupled to the anchors. Tensioning mechanisms can be used to apply force to the tethers, for example, to reduce a length of the tethers and position the anchors in unison with deployment of the airbag. The tensioning mechanisms can guide the tethers and anchors to orient the airbag during deployment and to support the anchors to maintain a position of the airbag during a vehicle event such as a collision.

In some examples, a curtain can be used to couple the tethers and the airbag. A generally synchronous or near concurrent deployment of the airbag and the tethers under tension can provide more efficient operation and positioning of the airbag in relatively open areas of a vehicle cabin, such as when side panels, doors, roof panels, pillars, or other surfaces are not available to support the airbag.

Figure 1:
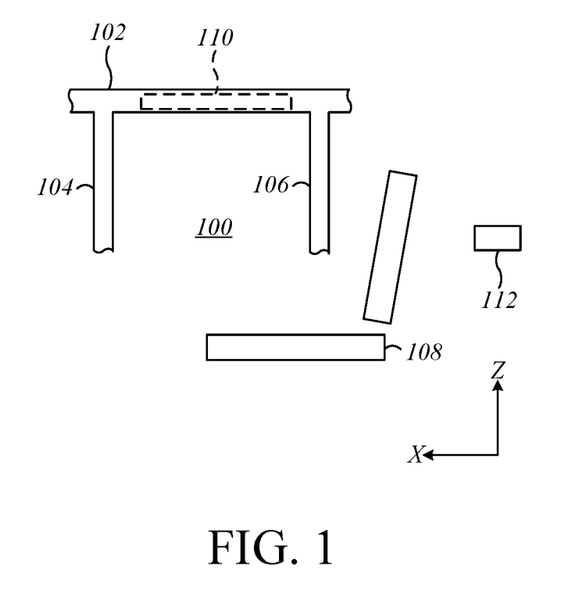
FIG. 1 is a schematic side view illustration of a vehicle cabin including a safety system.
Figure 2:
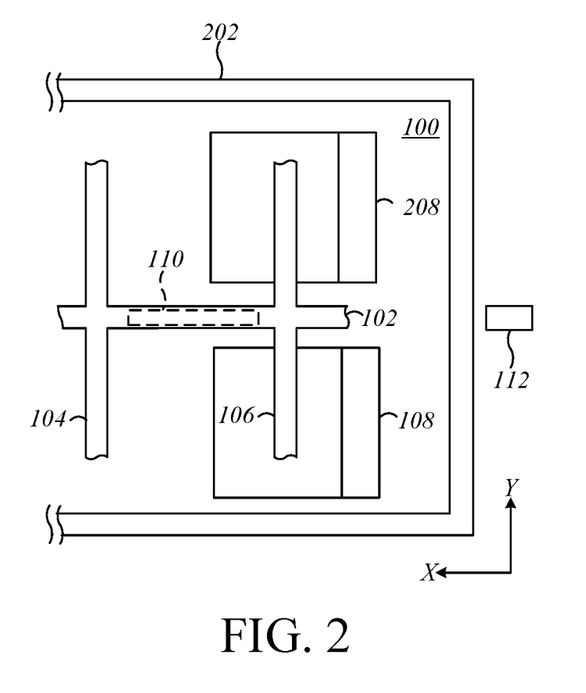
FIG. 2 is a schematic top view illustration of the vehicle cabin of FIG. 1.

FIGS. 1 and 2 are a schematic side view and top view illustration of a vehicle cabin 100. The vehicle cabin 100 is defined within or is otherwise interior to exterior components (not shown) of the vehicle. The vehicle cabin 100 can be described in reference to a longitudinal or X direction (e.g., fore-aft), a lateral or Y direction (e.g., side to side), and an elevational or Z direction (e.g., up-down).

The vehicle cabin 100 is defined as interior to various body structures such as roof rails, pillars, frames, body panels, interior panels, trim panels, and movable panels (e.g., doors, tailgate, hood, trunk lid, etc.). In the example of FIGS. 1 and 2, a body structure 102 can represent a roof rail that extends generally fore-aft in the X direction. Body structures 104, 106 can represent pillars or trim covers that extend generally vertically in the Z direction and optionally laterally in the Y direction and can, for example, be perpendicular to the body structure 102. A body structure 202 shown in FIG. 2 can represent a portion of sides and a back of the vehicle cabin 100 that extends both in the X direction and the Y direction, such as inclusive of doors or a belt line. The body structures 102, 104, 106, 202 are shown as partial components with truncation indications for simplicity of explanation.

The vehicle cabin 100 includes seats 108, 208. The seats 108, 208 can include structures such as pans, backs, headrests, frames, springs, other suspension members, cushioning materials (e.g., foam or rubber), covers, and/or other structures (not shown) suitable for use in seating occupants (not shown) within the vehicle cabin 100. The seats 108, 208 can also include restraints (not shown) for use in securing occupants to the seats 108, 208. The seats 108, 208 can be movable between various seating arrangements such that passenger safety solutions require flexibility in implementation. In the vehicle cabin 100 of FIGS. 1 and 2, the seats 108, 208 are shown as facing forward in the X direction.

The vehicle cabin 100 includes a safety system 110. The safety system 110 is shown in dotted line to represent a hidden location for packaging or storage of safety components (not shown) in a stowed position or in a pre-deployment condition, though other or additional locations for the safety system 110 are possible. For example, the safety system 110 may include airbags or curtains stowed behind various interior surfaces, such as within the body structures 102, 104, 106, 202 or the seats 108, 208 (not shown). The safety system 110 may also include housings, inflation mechanisms, deployment mechanisms, tensioning mechanisms, etc. used in implementation of the safety system 110 as further described herein. The location of the safety system 110 shown in FIGS. 1 and 2 is stored within the body structure 102 such that the safety system 110 is stowed both in front of and between the seats 108, 208 and between the body structures 104, 106.

Some components of the vehicle cabin 100 are in communication with a controller 112. For example, the controller 112 can be configured to prohibit, allow, or otherwise control movement of the seats 108, 208. The controller 112 can also be configured to prohibit, allow, or otherwise control components of the safety system 110, such as controlling deployment of airbags (not shown) or force application by tensioning mechanisms (not shown), for example, in response to receiving output signals from sensors (not shown) indicative of a vehicle event such as an imminent collision. The output signals from sensors can also include information indicative of orientation or position of the seats 108, 208 or orientation or position of occupants in respect to the seats 108, 208 of the vehicle cabin 100.

Figure 3:
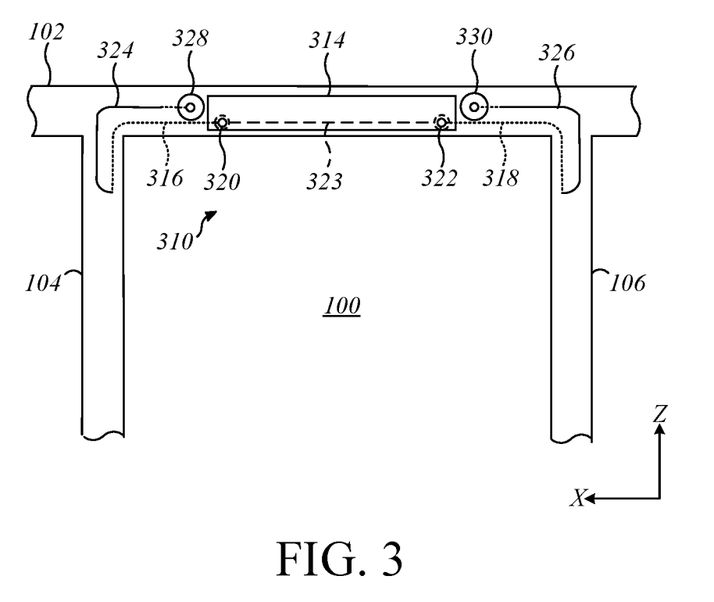
FIG. 3 is a schematic side view illustration of the vehicle cabin of FIG. 1 including a safety system in a stowed position.
Figure 4:
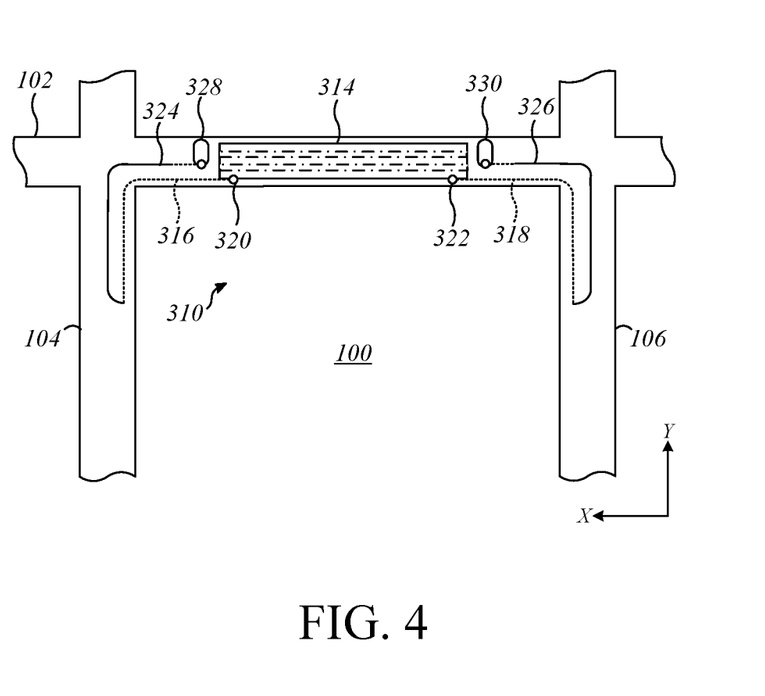
FIG. 4 is a schematic top view illustration of the vehicle cabin including the safety system of FIG. 3 in the stowed position.

FIGS. 3 and 4 are a schematic side view and top view illustration of the vehicle cabin 100 of FIGS. 1 and 2 including a safety system 310 in a stowed position. The safety system 310 can be similar to the safety system 110 of FIGS. 1 and 2. The safety system 310 includes an airbag 314 configured to deploy from an interior surface of the vehicle, such as in response to an output signal indicative of a vehicle event such as an imminent collision. In this example, the airbag 314 is packaged or disposed in and configured to deploy from the body structure 102. The body structure 102 can be a roof rail that extends in the X-direction above a central portion of the vehicle cabin 100. In this example, the airbag 314 is a roof airbag. Folds in the airbag 314 are shown in the top view of FIG. 4 using dash-dot lines to represent accordion-style folding of the airbag 314 for packaging, though a variety of folding or rolling schemes are possible. The airbag 314 is configured to restrain motion of an occupant (not shown) relative to the vehicle, for example, in the X direction. The airbag 314 can be formed from flexible materials, porous materials, non-porous materials, internal baffles, and other known elements.

The safety system 310 includes tethers 316, 318 shown in dotted line. The tethers 316, 318 are coupled at first ends to the airbag 314 via anchors 320, 322. The tethers 316, 318 extend from the anchors 320, 322 into or adjacent to the body structures 102, 104, 106. The tethers 316, 318 can be formed from cable, cord, fabric, or other materials suitable to sustain tension. The anchors 320, 322 can be formed from stitching, fabric loops, hooks, or other mechanism suitable to couple the tethers 316, 318 to the airbag 314. In the example of FIGS. 3 and 4, there are two tethers 316, 318 and two anchors 320, 322 shown, though the safety system 310 can include other numbers of these components depending, for example, on shapes and sizes of the airbag 314 and the body structures 102, 104, 106.

A reinforcement 323 is shown as optional in dashed line at location of the anchors 320, 322 and at a location near an edge of the airbag 314 that extends between the anchors 320, 322. The reinforcement 323 can strengthen the airbag 314 in order to avoid damage to the airbag 314, for example, when the tethers 316, 318 guide deployment of the airbag 314. The reinforcement 323 can be formed by an increased thickness of fabric at a location around the anchors 320, 322 and/or at a location near an edge of the airbag 314. The reinforcement 323 can formed by use of a high-strength material for the airbag 314 at the location around the anchors 320, 322 and/or at the location near an edge of the airbag 314, for example, a heat-resistant synthetic material. The reinforcement 323 can be formed by a separate material joined with a material that forms the airbag 314, such as by wires or threads of steel or aluminum integrated with or otherwise attached to the airbag 314. Other materials for the reinforcement 323 are also possible. The reinforcement 323 can be present at a location of the anchors 320, 322 as shown, between the anchors 320, 322 near an edge of the airbag as shown, at neither location, or at both locations. Though the reinforcement 323 is shown in respect to the side view of FIG. 3 (and similarly, the side views of FIGS. 5 and 7), the reinforcement 323 may instead or in addition be located so as to be viewable from the top view, for example, of FIGS. 4, 6, and 8.

The tethers 316, 318 can extend through tether housings 324, 326 disposed within the body structures 102, 104, 106. The tether housings 324, 326 are configured to route and package the tethers 316, 318 in respect to the body structures 102, 104, 106. Location, routing, structure, and size of the tether housings 324, 326 can be based on locations, shapes, and sizes of the airbag 314 and the tethers 316, 318. The tether housings 324, 326 can be optional, that is, the safety system 310 may operate without tether housings 324, 326.

The safety system 310 includes tensioning mechanisms 328, 330 coupled to second ends of the tethers 316, 318, that is, to ends of the tethers 316, 318 that are not coupled to the anchors 320, 322. In the example of FIGS. 3 and 4, the tensioning mechanisms 328, 330 are disposed in the body structure 102 adjacent to the airbag 314. The tensioning mechanisms 328, 330 are configured to apply force to the tethers 316, 318, for example, to reduce a length of the tethers 316, 318 during deployment of the airbag 314. The tensioning mechanisms 328, 330 can include various devices configured to apply force, such as a pyrotechnic device, an electromechanical device, a pneumatic device, a hydraulic device, a spring device, or a spool device paired with a motor as non-limiting examples. The tensioning mechanisms 328, 330 of FIGS. 3 and 4 are configured to apply force to the tethers 316, 318 in a direction toward the body structure 102 to reduce the length of the tethers 316, 318 as is further described herein.

Figure 5:
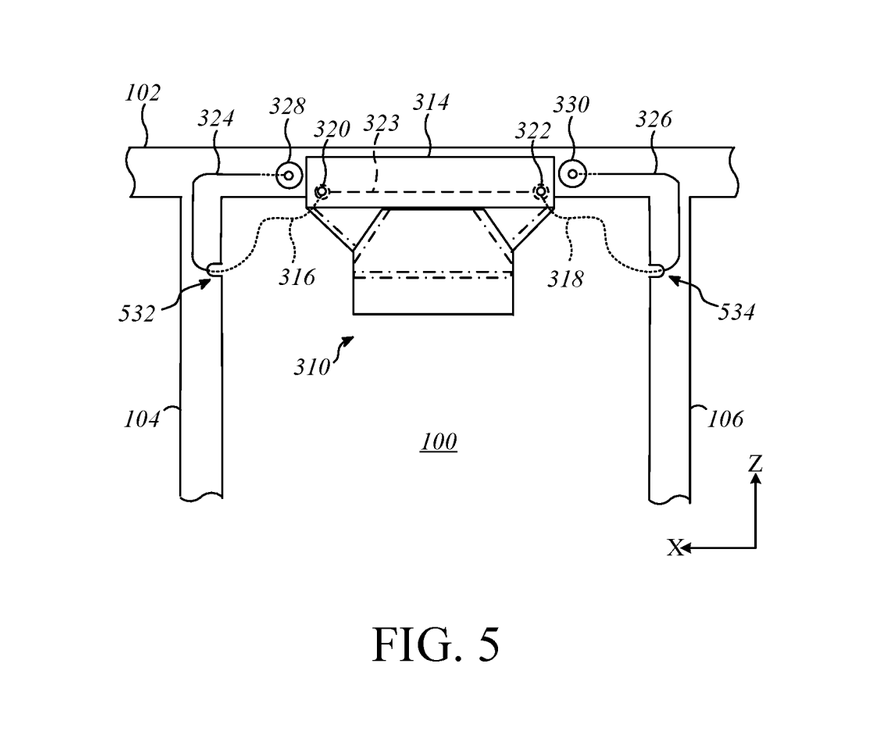
FIG. 5 is a schematic side view illustration of the vehicle cabin including the safety system of FIGS. 3 and 4 in a partially deployed position.
Figure 6:
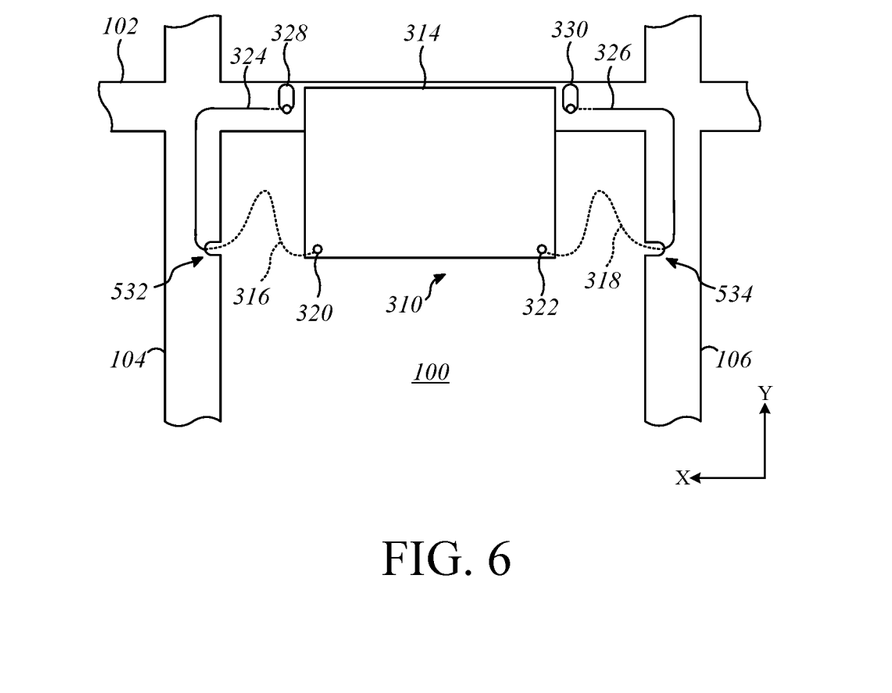
FIG. 6 is a schematic top view illustration of the vehicle cabin including the safety system of FIGS. 3 to 5 in the partially deployed position.

FIGS. 5 and 6 are a schematic side view and top view illustration of the safety system 310 of FIGS. 3 and 4 in a partially deployed position. As compared to the stowed position shown in FIGS. 3 and 4, the tethers 316, 318 have deployed from the body structures 104, 106 by exiting the body structures 104, 106 at respective breakaway portions 532, 534. The tethers 316, 318 may be configured to physically break apart from the body structures 104, 106, such as by tearing through fabric (not shown) that covers the body structures 104, 106. In another example, the tethers 316, 318 can be clipped, wedged, or otherwise held adjacent to edges of the body structures 104, 106 such that deployment of the tethers 316, 318 into the vehicle cabin 100 occurs when tension is present between the tethers 316, 318 and the anchors 320, 322, such as when the airbag 314 begins to deploy as shown in FIG. 5.

During deployment, the anchors 320, 322 move laterally away from the body structure 102 in the Y direction as shown in FIG. 6 while the airbag 314 inflates. Motion of the anchors 320, 322 at this stage of the deployment process can be primarily guided by unfolding of the airbag 314, optional presence of the reinforcement 323 at the location around and/or between the anchors 320, 322 near the edge of the airbag 314, or other motion of the portion of the airbag 314 to which the anchors 320, 322 are coupled. This motion can cause slack in the tethers 316, 318, as middle sections of the tethers are held by the tether housings 324, 326 to extend from the body structures 104, 106 at a location of the breakaway portions 532, 534. The slack is represented by the undulating dotted lines of the tethers 316, 318 in the partially deployed position of the safety system 310 shown in FIGS. 5 and 6. In order to hold the anchors 320, 322 and the airbag 314 in position in relation to the body structures 102, 104, 016, the tensioning mechanisms 328, 330 can be implemented as described herein.

Deployment of the airbag 314, the tethers 316, 318, or both can be effected using one or more deployment mechanisms (not shown). The deployment mechanism(s) can be configured to break away a portion of the interior surface, such as the breakaway portions 532, 534 covering the body structures 104, 106, to allow the airbag 314 to deploy and the tethers 316, 318 to guide the anchors 320, 322 in traveling from the stowed position of FIGS. 3 and 4 to the partially deployed position shown in FIGS. 5 and 6 (and the deployed position shown in FIGS. 7 and 8). The deployment mechanism(s) may be configured as one or more of a pyrotechnic device, an electromechanical device, a pneumatic device, a hydraulic device, and/or a pre-tensioned spring device.

The deployment mechanism(s) can be configured to cause or enable the breakaway portions 532, 534 to open, detach, or break away from the remainder of the interior surface. For example, an electromechanical device can include an electric motor, a threaded rod, and a threaded guide coupled to a sensor module (not shown) to receive commands from a controller such as the controller 112 of FIGS. 1 and 2. A pneumatic device can include pressurized gas (or a vacuum) configured to effect movement of a piston (not shown) based on a command from the controller 112. A pre-tensioned spring device can include a spring that is coupled to a sensor module (not shown). The spring can be held in tension until being selectively released, for example, based on a command from the controller. Though only breakaway portions 532, 534 are shown, additional breakaway portions, such as associated with the body structure 102 and the airbag 314 may also be present in the safety system 310.

Figure 7:
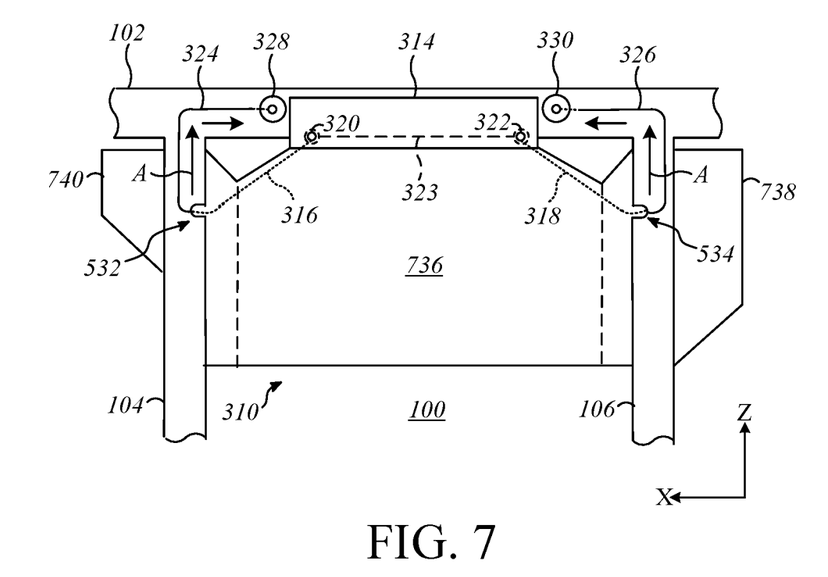
FIG. 7 is a schematic side view illustration of the vehicle cabin including the safety system of FIGS. 3 to 6 in a deployed position.
Figure 8:
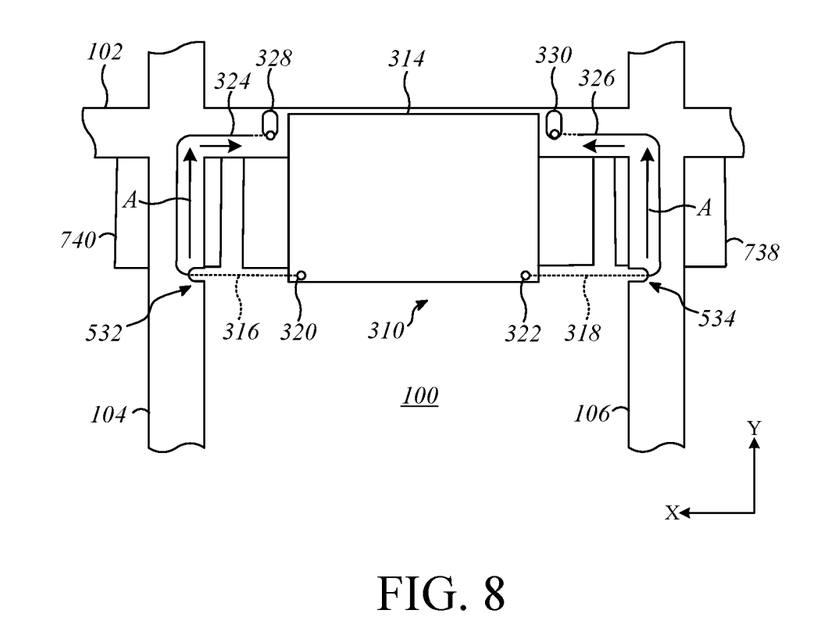
FIG. 8 is a schematic top view illustration of the vehicle cabin including the safety system of FIGS. 3 to 7 in the deployed position.

FIGS. 7 and 8 are a schematic side view and top view illustration of the safety system 310 of FIGS. 3 to 6 with the airbag 314 and the anchors 320, 322 in a fully deployed position. Both motion and position of the anchors 320, 322 can be controlled by applying force in the direction indicated by the arrows A in FIGS. 7 and 8 using the tensioning mechanisms 328, 330. The tensioning mechanisms 328, 330 can include one or more of pyrotechnic device(s), electromechanical device(s), pneumatic device(s), hydraulic device(s), spring device(s), or a spool device, for example, paired with a motor. In other examples (not shown), the tensioning mechanisms 328, 330 may be disposed in the body structures 104, 106, here, pillars or trim covers, at a location below the breakaway portions 532, 534 in the Z direction. If the tensioning mechanisms 328, 330 are packaged in the body structures 104, 106 in this manner, the tensioning mechanisms 328, 330 would be configured to apply force to the tethers 316, 318 in a direction opposite of the arrows A, that is, away from the body structure 102 in order to reduce the length of the tethers 316, 318 and hold the position of the anchors 320, 322.

In the example shown in FIGS. 7 and 8, force is applied to the tethers 316, 318 by the tensioning mechanisms 328, 330 in the direction of the arrows A to pull the tethers 316, 318 toward the body structure 102, here, a roof rail, as the tensioning mechanisms 328, 330 are packaged in a location proximate to the airbag 314 in the body structure 102. The term "proximate" is used to indicate a position behind, adjacent to, or next to the airbag 314. In other words, the tethers 316, 318 are shortened in length in order to guide the anchors 320, 322 from the stowed position shown in FIGS. 3 and 4 where the anchors 320, 322 are located proximate to the body structure 102 to the deployed position shown in FIGS. 7 and 8 where the anchors 320, 322 are spaced from the body structures 102, 104, 106. The term "spaced from" is used to indicate a position at a distance apart from the body structures 102, 104, 106 such that movement of the anchors 320, 322 from the stowed position to the deployed position involves travel of the anchors 320, 322 over a predetermined distance such as over tens of centimeters, over one-half meter, or over one meter. In the deployed position, the anchors 320, 322 are configured to support and properly position the airbag 314 to react impact forces from the occupant (not shown) during a vehicle event such as a collision.

Based on the force applied by the tensioning mechanisms 328, 330, the tethers 316, 318 are configured to maintain the anchors 320, 322 in the deployed position during the vehicle event. The optional reinforcement 323, shown in FIG. 7, can strengthen an edge of the airbag 314 and the connection between the anchors 320, 322 and the airbag 314 to allow the relevant portion(s) of the airbag 314 to better sustain the force applied by the tethers 316, 318. The tensioning mechanisms 328, 330 are configured to maintain a tension level of the tethers 316, 318 above a tension threshold while the airbag 314 restrains motion of the occupant (not shown) relative to the vehicle cabin 100. The tension threshold can be predetermined, based, for example, on a size or location of the occupant and/or on a size of the airbag 314 and a location of the body structures 102, 104, 106 in respect to the location of the anchors 320, 322 when fully deployed. The tension threshold is a non-zero positive value indicating application of a tension force between the tethers 316, 318 and the anchors 320, 322.

The airbag 314 is shown in FIGS. 7 and 8 as including a main chamber 736 coupled to the anchors 320, 322 and auxiliary chambers 738, 740 coupled to and sealed in respect to the main chamber 736, in this example, using dashed lines to show boundaries between the chambers 736, 738, 740. The main chamber 736 is configured to provide support to the auxiliary chambers 738, 740. The auxiliary chambers 738, 740 can serve as cushioning and reaction surfaces during vehicle events. For example, the auxiliary chambers 738, 740 can be configured to be inflated to a pressure level that differs from a pressure level of the main chamber 736 using an inflation mechanism (not shown) that is sealed from and passes through the main chamber 736.

Figure 9:
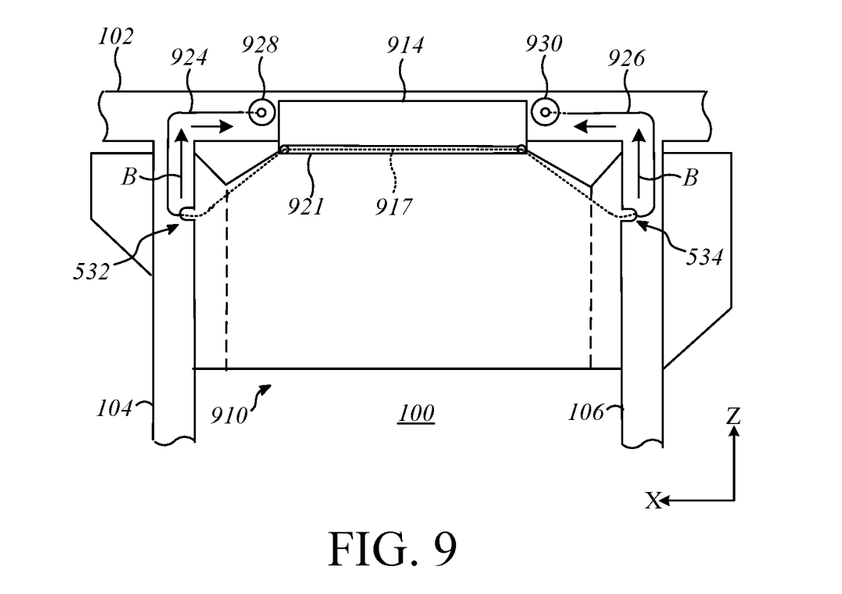
FIG. 9 is a schematic side view illustration of the vehicle cabin of FIG. 1 including another safety system deployed position.
Figure 10:
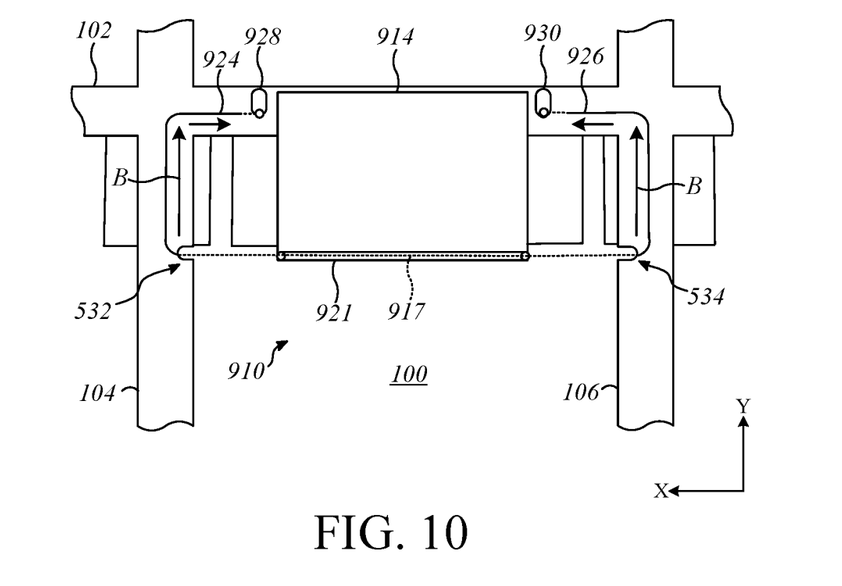
FIG. 10 is a schematic top view illustration of the vehicle cabin including the safety system of FIG. 9 in the deployed position.

FIGS. 9 and 10 are a schematic side view and top view illustration of another safety system 910 with an airbag 914 in a fully deployed position. Many of the features of the safety system 910 are similar to the safety systems 110, 310 of FIGS. 1 to 8, so only differences will be highlighted for brevity. The safety system 910 includes an airbag 914 deployed from the body structure 102, here, a roof rail. The safety system also includes a tether 917 configured to extend between the body structures 104, 106, here, between pillars or trim covers, and along an edge of the airbag 914. Routing of the tether 917 along the edge of the airbag 914 is accomplished with a single anchor 921, though multiple anchors similar to the anchors 320, 322 are also possible. In the example of FIGS. 9 and 10, the anchor 921 can be formed in or attached to the airbag 914, such as a tube, a loop, a tunnel, a channel, or other routing and anchoring mechanism. The anchor 921 can be reinforced, such as by using thicker or stronger material for the airbag 914 at a location where the tether 917 is routed through or adjacent to the airbag 914.

Both motion and position of the anchor 921 and thus, the airbag 914, can be controlled by applying force to the tether 917 in the direction indicated by the arrows B using tether housings 924, 926 and tensioning mechanisms 928, 930. The tether housings 924, 926 can guide a path of the tether 917 through the body structures 102, 104, 106. The tensioning mechanisms 928, 930 can include one or more of pyrotechnic device(s), electromechanical device(s), pneumatic device(s), hydraulic device(s), spring device(s), or a spool device, for example, paired with a motor and configured to apply force to opposite ends of the tether 917. In other examples (not shown), the tensioning mechanisms 928, 930 may be disposed in the body structures 104, 106, here, pillars or trim covers, at a location below the breakaway portions 532, 534 in the Z direction. If the tensioning mechanisms 928, 930 are packaged in the body structures 104, 106 in this manner, the tensioning mechanisms 328, 330 would be configured to apply force to the tethers 917 in a direction opposite of the arrows B, that is, away from the body structure 102 in order to pull the tether 917 taught from both ends and hold the position of the anchor 921.

Based on the force applied by the tensioning mechanisms 928, 930, the tether 917 can be held taught and a location of the anchor 921 can be held in the deployed position during a vehicle event in which the airbag 914 is deployed. The tensioning mechanisms 928, 930 are configured to maintain a tension level of the tether 917 above a tension threshold while the airbag 914 restrains motion of the occupant (not shown) relative to the vehicle cabin 100. The tension threshold can be predetermined, based, for example, on a size or location of the occupant and/or on a size of the airbag 914 and a location of the body structures 102, 104, 106 in respect to the location of the anchor 921 when fully deployed. The tension threshold is a non-zero positive value indicating application of a tension force to the tether 917.

During a vehicle event, synchronous or near synchronous deployment of the airbags 314, 914, the tethers 316, 318, 917, and the tensioning mechanisms 328, 330, 928, 930 allows for efficient operation of the airbags 314, 914 in relatively open areas of the vehicle cabin 100, such as when side panels, doors, roof panels, pillars, or other surfaces are not available to provide reaction surfaces or anchor locations suitable to position the airbags 314, 914. The sequence and timing of deployment of various components depends on relative positions of the airbags 314, 914, the tethers 316, 318, 917, and the tensioning mechanisms 328, 330, 928, 930 in respect to each other and other components within the vehicle cabin 100.

The safety systems 310, 910 can be adaptive systems (e.g., with multi-stage or multi-chamber airbags 314, 914 as shown) to enable occupant contact with the airbags 314, 914 to be optimally timed and to better control motion of the occupant. The vehicle cabin 100 can also include advanced sensors (not shown) to determine proper timing for the airbags 314, 914, the tethers 316, 318, 917, and the tensioning mechanisms 328, 330, 928, 930 to deploy or engage depending on various aspects such as severity, location, and speed of an imminent collision, occupant size, occupant mass, position of the seats 108, 208, restraint usage, etc.

The types of sensors employed can be varied and can communicate information a controller (not shown) similar to the controller 112 of FIGS. 1 and 2. For example, the sensors can include sensors configured to capture information from an external environment outside of the vehicle cabin 100. External-sensing sensors can includes technologies such as radar, LIDAR, imaging, infrared, or other technologies configured to detect potential vehicle events such as collisions and provide information to the controller to allow a determination of timing of the vehicle event. The sensors can also include sensors internal to the vehicle cabin 100 such as weight sensors, buckle switch sensors, internal cameras, seat position sensors, imaging sensors, etc. that can provide information to the controller to allow determinations to be made related to deployment timing for the safety systems 310, 910.

Figure 11:
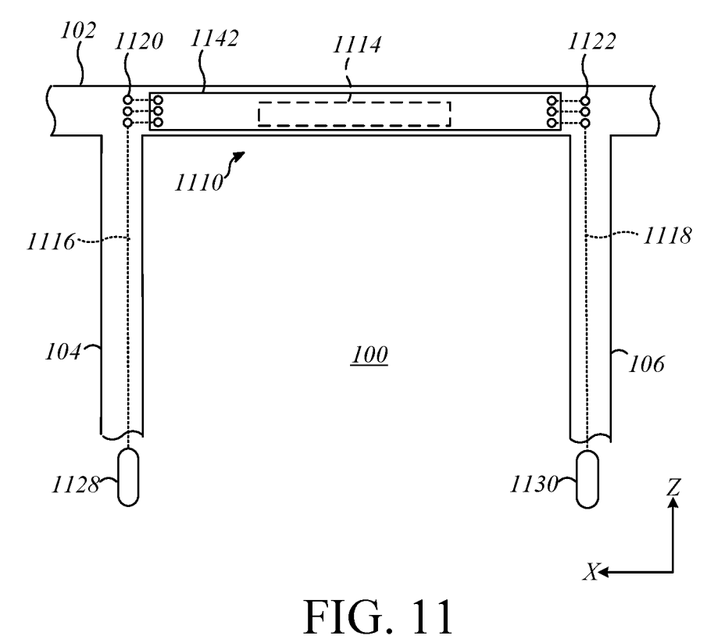
FIG. 11 is a schematic side view illustration of the vehicle cabin of FIG. 1 including another safety system in a stowed position.

FIG. 11 is a schematic side view illustration of the vehicle cabin 100 including another safety system 1110 in a stowed position. Many of the features of the safety system 1110 are similar to the safety systems 110, 310, 910 of FIGS. 1 to 10, so only differences will be highlighted for brevity. The safety system 1110 includes a curtain 1142 configured to extend between the body structures 104, 106, here, between pillars or trim covers. The safety system 1110 also includes an airbag 1114 shown in dotted line as packaged behind the curtain 1142 and proximate to (or within) the body structure 102. In this example, the airbag 1114 is a roof airbag.

The curtain 1142 and the airbag 1114 are configured to deploy from an interior surface of the vehicle, such as the body structure 102, here, a roof rail, in response to an output signal indicative of a vehicle event such as an imminent collision. The curtain 1142 is configured to prohibit items within the vehicle cabin 100, such as loose articles or limbs of an occupant (not shown) to exit the vehicle cabin 100 during a vehicle event. The airbag 1114 is configured to restrain motion of an occupant (not shown) relative to the vehicle, for example, in the X direction. The airbag 1114 and the curtain 1142 can be formed from flexible materials, porous materials, non-porous materials, internal baffles, and other known elements.

Figure 12:
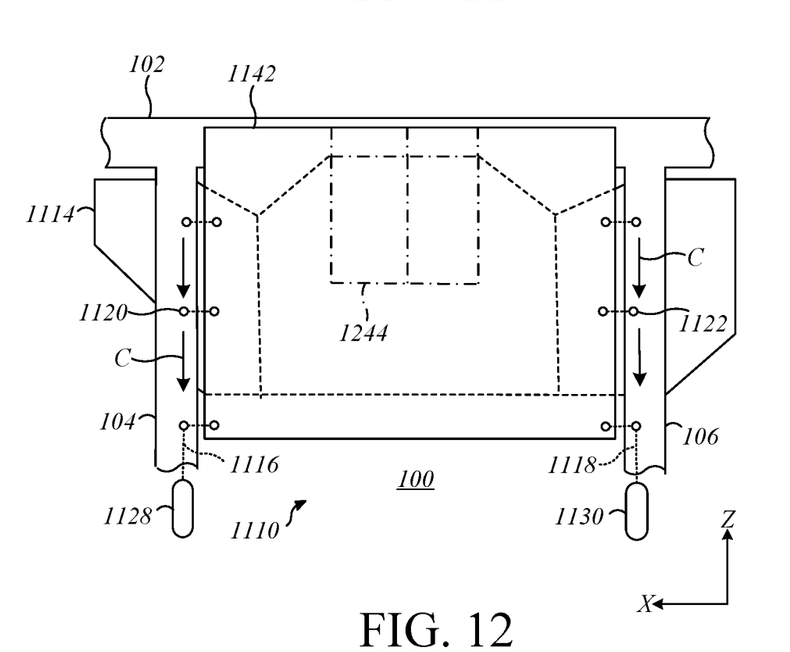
FIG. 12 is a schematic side view illustration of the vehicle cabin including the safety system of FIG. 11 in a deployed position.

The safety system 1110 includes tethers 1116, 1118 shown in dotted line. The tethers 1116, 1118 are coupled at first ends to the curtain 1142 via anchor mechanisms 1120, 1122. In this example, the anchor mechanisms 1120, 1122 include pairs of clips, rivets, balls, or other connecting elements coupled by cords or cables. The anchor mechanisms 1120, 1122 are configured to allow tension to be applied to the curtain 1142 in multiple areas during deployment of the curtain 1142 and the airbag 1114 using the tethers 1116, 1118. The tethers 1116, 1118 can be formed from cable, cord, fabric, or other materials suitable to provide tension. In the example of FIGS. 11 and 12, there are two tethers 1116, 1118 and two anchor mechanisms 1120, 1122 shown, though the safety system 1110 can include other numbers of these components depending, for example, on shapes, sizes, and locations of the airbag 1114 and the body structures 102, 104, 106.

The safety system 1110 includes tensioning mechanisms 1128, 1130 coupled to second ends of the tethers 1116, 1118, that is, to ends of the tethers 1116, 1118 that are not coupled to the anchor mechanisms 1120, 1122. In the example of FIGS. 11 and 12, the tensioning mechanisms 1128, 1130 are disposed within or below (in the Z direction) the body structures 104, 106 in a manner spaced from the airbag 1114 and the curtain 1142 when the airbag 1114 and the curtain 1142 are in the stowed position as shown in FIG. 11. The tensioning mechanisms 1128, 1130 are configured to apply force to the tethers 1116, 1118, for example, to reduce a length of the tethers 1116, 1118 and to deploy the curtain 1142 coupled to the tethers 1116, 1118 by way of expanding the anchor mechanisms 1120, 1122.

The tensioning mechanisms 1128, 1130 can include various devices configured to apply force, such as a pyrotechnic device, an electromechanical device, a pneumatic device, a hydraulic device, a spring device, or a spool device paired with a motor as non-limiting examples. The tensioning mechanisms 1128, 1130 of FIGS. 11 and 12 are configured to apply force to the tethers 1116, 1118 in a direction away from the body structure 102, that is, away from the interior surface from which the airbag 1114 and the curtain 1142 are deployed. Both motion of the curtain 1142 and a position of the airbag 1114 in respect to the curtain 1142 are controlled by the force applied by the tensioning mechanisms 1128, 1130 as described in reference to FIG. 12.

FIG. 12 is a schematic side view illustration of the vehicle cabin 100 including the safety system 1110 of FIG. 11 in a deployed position. As compared to the stowed position in FIG. 11, the anchor mechanisms 1120, 1122 are shown with elements spread vertically in the Z direction along sides of the curtain 1142. The spread can be achieved, for example, by using the tensioning mechanisms 1128, 1130 to apply force in a direction indicated by the arrows C to the tethers 1116, 1118 to shorten the tethers 1116, 1118 and expand the anchor mechanisms 1120, 1122. Application of force can deploy the curtain 1142 coupled to the anchor mechanisms 1120, 1122. In some examples, the anchor mechanisms 1120, 1122 can travel within an anchor guide (not shown) formed or disposed within the body structures 104, 106 to predetermined positions as shown. That is, components of the anchor mechanisms 1120, 1122 are configured to spread apart while traversing the anchor guide while the curtain 1142 travels from the stowed position to the deployed position shown in FIG. 12. In other examples, the body structures 104, 106 are shaped to serve as the anchor guide for the anchor mechanisms 1120, 1122.

In FIG. 12, the airbag 1114 is shown as fully deployed, partially in dotted line based on being located behind the curtain 1142. An outer surface of the airbag 1114 is coupled to the curtain 1142 using a pattern of stitches 1244 shown in dashed-dot lines. The pattern of stitches 1244 can vary in shape, size, and location. In this example, the pattern of stitches 1244 connects the curtain 1142 to a central, support-providing region of the airbag 1114. The connection between the airbag 1114 and the curtain 1142 can also be effected using adhesives, joints, loops, or other connection mechanisms in addition to or in place of the pattern of stitches 1244. By coupling an outer surface of the airbag 1114 and the curtain 1142, the airbag 1114 is able to be positioned in respect to an occupant (not shown) based on tension generated by the tensioning mechanisms 1128, 1130 in the direction of the arrows C that acts sequentially upon the tethers 1116, 1118, the anchor mechanisms 1120, 1122, the curtain 1142, and the airbag 1114 via the pattern of stitches 1244.

In operation, the tensioning mechanisms 1128, 1130 apply force to the tethers 1116, 1118, the tethers 1116, 1118 apply force to the anchor mechanisms 1120, 1122, the components of the anchor mechanisms 1120, 1122 expand and move along the anchor guide (not shown), and the connection between the anchor mechanisms 1120, 1122 and the curtain 1142 causes the curtain 1142 to travel from the stowed position shown in FIG. 11 to the deployed position shown in FIG. 12 where the curtain 1142 extends between the body structures 104, 106, here, the pillars or trim covers, in unison with deployment of the airbag 1114. To effect this guiding motion, the tensioning mechanisms 1128, 1130 can include one or more of pyrotechnic device(s), electromechanical device(s), pneumatic device(s), hydraulic device(s), spring device(s), or a spool device, for example, paired with a motor.

The airbag 1114 in FIG. 12 is shown as having a main chamber that includes the outer surface coupled to the curtain 1142 using the pattern of stitches 1244. The airbag 1114 also includes a pair of auxiliary chambers coupled to and optionally sealed in respect to the main chamber. In some examples, the auxiliary chambers are configured to be inflated to a pressure level that differs from a pressure level of the main chamber by an inflation mechanism (not shown) that is sealed from and passes through the main chamber. Other configurations of the airbag 1114 are also possible.

A benefit of using the tensioning mechanisms 1128, 1130 and the tethers 1116, 1118 to control deployment of the curtain 1142 and positioning of the airbag 1114 is that location, space between, and shape of the body structures 102, 104, 106 does not reduce efficacy of the safety system 1110. For example, when the body structure 102 is a roof rail that extends in the X direction between the seats 108, 208 (see FIG. 2) and the body structures 104, 106 are pillars or trim covers that extend both vertically in the Z direction and laterally in the Y direction, such as in a curved manner, the curtain 1142 can be controlled to follow the shape of the body structures 104, 106 based on use of the anchor mechanisms 1120, 1122.

Though the safety systems 310, 910, 1110 are described as having multiple anchors, one or multiple tethers, and multiple tensioning mechanisms, implementation can be effected using one anchor or multiple anchors, one tether or multiple tethers, and one tensioning mechanism (not shown) or multiple tensioning mechanisms depending on architecture of the vehicle cabin 100 and tension threshold requirements. For example, a safety system with one anchor, one tether, and one tensioning mechanism (not shown) may be packaged proximate to the seat 108 in the body structure 202 shown in FIG. 2.

Figure 13:
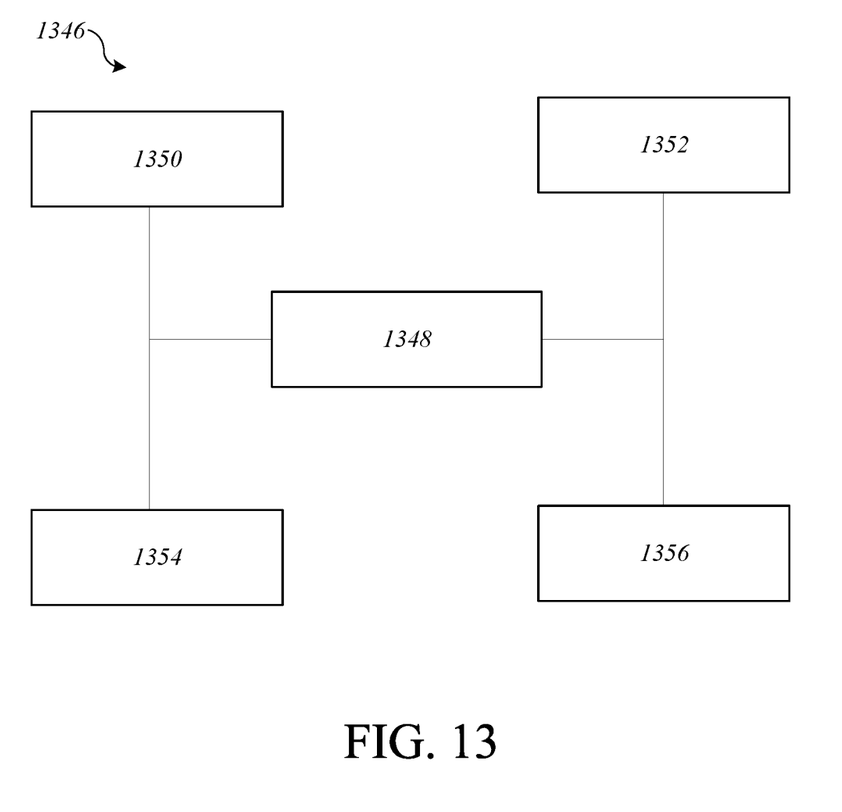
FIG. 13 is a block diagram of a safety system.

FIG. 13 is a block diagram that shows a safety system 1346. The safety system 1346 can include a controller 1348, sensors 1350, guiding mechanisms 1352, tensioning mechanisms 1354, and an airbag 1356. The safety system 1346 can include components similar to components described in reference to the safety systems 110, 310, 910, 1110 of FIGS. 1 to 12. The guiding mechanisms 1352 can operate in a manner similar to the anchors 320, 322, 921, the anchor mechanisms 1120, 1122, the tethers 316, 318, 917, 1116, 1118, and/or the curtain 942 described in reference to FIGS. 3 to 12. The tensioning mechanisms 1354 can include components similar to components described in reference to the tensioning mechanisms 328, 330, 928, 930, 1128, 1130 of FIGS. 3 to 12. The airbag 1356 can operate in a manner similar to the airbags 314, 914, 1114 described in reference to FIGS. 3 to 12. The safety system 1346 is shown as including the sensors 1350, the guiding mechanisms 1352, the tensioning mechanisms 1354, and the airbag 1356, but one or more of these components may be absent from the safety system 1346.

The controller 1348 coordinates operation of the safety system 1346 by communicating electronically (e.g., using wired or wireless communications) with the sensors 1350, the guiding mechanisms 1352, the tensioning mechanisms 1354, and the airbag 1356. The controller 1348 may receive information (e.g., signals, information, and/or data) from the sensors 1350 and may receive information from and/or send information to other portions of the safety system 1346 such as the guiding mechanisms 1352, the tensioning mechanisms 1354, and the airbag 1356, or other portions (not shown).

The sensors 1350 may capture or receive information related, for example, to components of the safety system 1346 and from an external environment where the safety system 1346 is located. The external environment can be an exterior of a vehicle or an interior of a vehicle such as the vehicle cabin 100 of FIGS. 1 to 12. Information captured or received by the sensors 1350 can relate to seats, occupants, operation of other vehicles, pedestrians and/or objects in the external environment, operating conditions of the vehicle, operating conditions or trajectories of other vehicles, and/or other conditions within the vehicle or exterior to the vehicle.

The safety system 1346 can change an operational mode of the guiding mechanisms 1352, the tensioning mechanisms 1354, and the airbag 1356 based on a control signal, such as a signal from the controller 1348. The control signal may be based on information captured or received by the sensors 1350 and may cause various components within the safety system 1346 to change between various operational modes, such as between stowed positions, partially deployed positions, and deployed positions.

Figure 14:
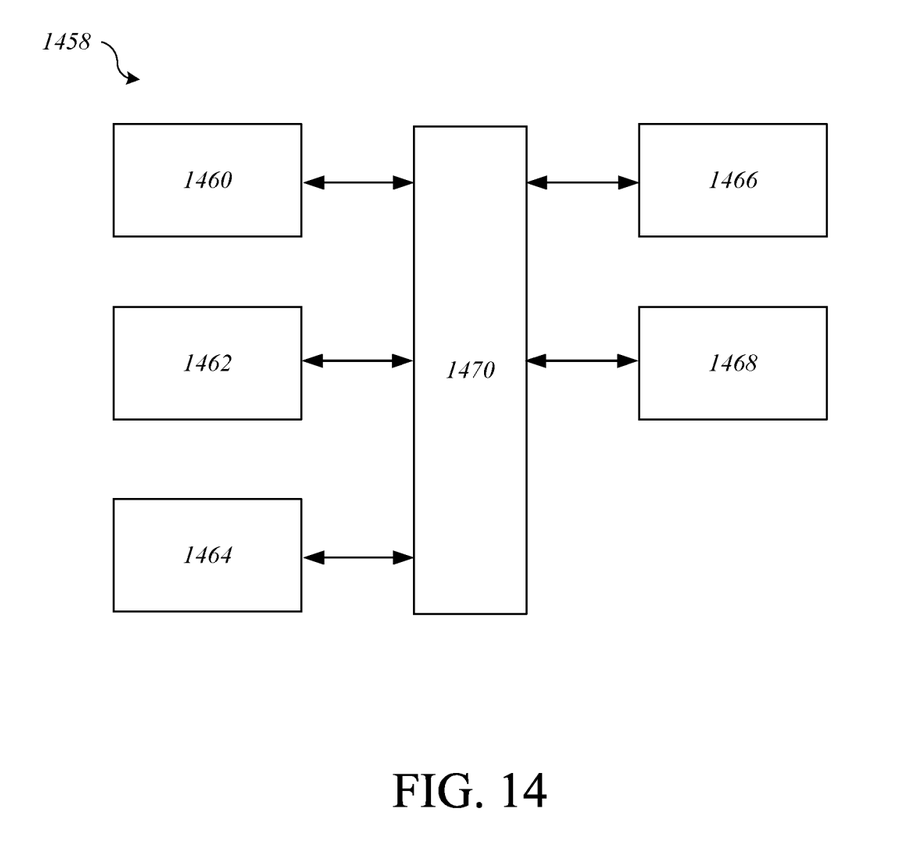
FIG. 14 is an illustration of a hardware configuration for a controller.

FIG. 14 shows an example of a hardware configuration for a controller 1458 that may be used to implement the controller 1348 and/or other portions of the safety system 1346. In the illustrated example, the controller 1458 includes a processor 1460, a memory device 1462, a storage device 1464, one or more input devices 1466, and one or more output devices 1468. These components may be interconnected by hardware such as a bus 1470 that allows communication between the components.

The processor 1460 may be a conventional device such as a central processing unit and is operable to execute computer program instructions and perform operations described by the computer program instructions. The memory device 1462 may be a volatile, high-speed, short-term information storage device such as a random-access memory module. The storage device 1464 may be a non-volatile information storage device such as a hard drive or a solid-state drive. The input devices 1466 may include sensors such as the sensors 1350 and/or any type of human-machine interface, such as buttons, switches, a keyboard, a mouse, a touchscreen input device, a gestural input device, or an audio input device. The output devices 1468 may include any type of device operable to send commands associated with an operating mode or state or provide an indication to a user regarding an operating mode or state, such as a display screen, an interface for a safety system such as the safety system 1346, or an audio output.

As described above, one aspect of the present technology is the gathering and use of data available from various sources, such as from the sensors 1350 or user profiles, to improve the function of safety systems such as the safety systems 110, 310, 910, 1110, 1346. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and exercise information), date of birth, or any other identifying or personal information.

The present disclosure recognizes that the use of personal information data, in the present technology, can be used to the benefit of users. For example, the personal information data can be used to deliver changes to operational modes of safety systems such as the safety systems 110, 310, 910, 1110, 1346 to best match user preferences or profiles. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes in safety systems can be implemented for a given user by inferring user preferences or user status based on non-personal information data, a bare minimum amount of personal information, other non-personal information available to the system, or publicly available information.

What is claimed is:

1. A safety system for a vehicle, comprising:
an airbag configured to:
   deploy from an interior surface of the vehicle; and
   restrain motion of an occupant relative to the vehicle;
a tether coupled to a top of the airbag via an anchor, the tether configured to:
   guide the anchor from a stowed position proximate to the interior surface to a deployed position spaced from the interior surface of the vehicle; and
   maintain the anchor in the deployed position while the airbag restrains motion of the occupant relative to the vehicle; and
a tensioning mechanism configured to apply force to the tether to reduce a length of the tether during deployment of the airbag,
wherein the airbag comprises a main chamber coupled to the anchor and one or more auxiliary chambers coupled to and sealed with respect to the main chamber, and wherein the one or more auxiliary chambers are configured to be inflated to a pressure level that differs from a pressure level of the main chamber.

2. The safety system of claim 1, wherein the tensioning mechanism is further configured to:
maintain a tension level of the tether above a tension threshold while the airbag restrains motion of the occupant relative to the vehicle.

3. The safety system of claim 1, wherein the airbag is disposed in and configured to deploy from a roof rail of the vehicle.

4. The safety system of claim 3, wherein the airbag and the tensioning mechanism are disposed adjacent to each other in the roof rail.

5. The safety system of claim 3, wherein the tether is configured to deploy from a pillar of the vehicle, and wherein the pillar is generally perpendicular to the roof rail.

6. The safety system of claim 5, wherein the tensioning mechanism is disposed in the pillar and configured to apply force to the tether in a direction away from the roof rail to reduce the length of the tether.

7. The safety system of claim 1, wherein the tensioning mechanism includes at least one of a pyrotechnic device, an electromechanical device, a pneumatic device, a hydraulic device, a spring device, or a spool device.

8. The safety system of claim 1, wherein the airbag deploys and the anchor travels from the stowed position to the deployed position in response to an output signal indicative of an imminent collision.

9. The safety system of claim 1, further comprising:
a deployment mechanism configured to break away a portion of the interior surface to allow the airbag to deploy and the tether to guide the anchor in traveling from the stowed position to the deployed position, wherein the deployment mechanism includes at least one of a pyrotechnic device, an electromechanical device, a pneumatic device, a hydraulic device, or a pre-tensioned spring device.

10. A safety system for a vehicle, comprising:
a roof airbag configured to deploy from a roof rail of the vehicle and restrain motion of an occupant relative to the vehicle;
a tether routed through a tether housing and configured to deploy from a pillar of the vehicle;

an anchor coupling the tether and a top portion of the roof airbag, the anchor configured to travel from a stowed position proximate to the roof rail to a deployed position spaced apart from the roof rail and spaced apart from the pillar in unison with deployment of the airbag; and a tensioning mechanism configured to apply force to the tether after deployment of the airbag in a direction determined by a path of the tether housing, wherein motion of the anchor is controlled by the force applied by the tensioning mechanism.

11. The safety system of claim 10, wherein the tensioning mechanism is configured to reduce a length of the tether during deployment of the airbag and maintain a tension level of the tether above a tension threshold while the airbag restrains motion of the occupant relative to the vehicle.

12. The safety system of claim 10, wherein the tensioning mechanism is disposed in the roof rail adjacent to the airbag and is configured to apply force to the tether in a direction toward the roof rail.

13. The safety system of claim 10, wherein the tensioning mechanism is disposed in the pillar and configured to apply force to the tether in a direction away from the roof rail.

14. The safety system of claim 10, wherein the tensioning mechanism includes at least one of a pyrotechnic device, an electromechanical device, a pneumatic device, a hydraulic device, a spring device, or a spool device.

15. The safety system of claim 10, wherein the tether housing is located along the roof rail, the pillar, or both, and wherein a middle section of the tether is held by the tether housing.

16. The safety system of claim 10, wherein the roof airbag comprises a main chamber coupled to the anchor and one or more auxiliary chambers coupled to and sealed with respect to the main chamber, and wherein the one or more auxiliary chambers are configured to be inflated to a pressure level that differs from a pressure level of the main chamber.

17. A safety system for a vehicle, comprising:

an airbag configured to deploy from an interior surface of the vehicle and restrain motion of an occupant relative to the vehicle;

a tether configured to cause the airbag to travel from a stowed position within the interior surface of the vehicle to a deployed position extending between pillars of the vehicle; and tensioning mechanisms disposed within the interior surface proximate to the airbag, the tensioning mechanisms configured to apply opposing forces to opposite ends of the tether, wherein a position of a top of the airbag is controlled by the opposing forces applied by the tensioning mechanisms.

18. The safety system of claim 17, wherein the tensioning mechanisms are configured to apply opposing forces to the opposite ends of the tether in directions toward the interior surface from which the airbag deploys.

19. The safety system of claim 17, wherein the airbag comprises a main chamber and one or more auxiliary chambers coupled to and sealed with respect to the main chamber, and wherein the one or more auxiliary chambers are configured to be inflated to a pressure level that differs from a pressure level of the main chamber.

20. The safety system of claim 17, wherein the tether is configured to deploy from opposing breakaway portions of the pillars of the vehicle.

21. The safety system of claim 17, wherein the interior surface of the vehicle is a roof rail of the vehicle.

\* \* \* \* \*